United States Patent
Shimada et al.

(10) Patent No.: US 8,220,811 B2
(45) Date of Patent: Jul. 17, 2012

(54) ARM MATERIAL AND A METHOD FOR ITS MANUFACTURE

(75) Inventors: Naoaki Shimada, Osaka (JP); Michitaka Yoshida, Amagasaki (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 12/769,899

(22) Filed: Apr. 29, 2010

(65) Prior Publication Data

US 2010/0276902 A1 Nov. 4, 2010

Related U.S. Application Data

(63) Continuation of application No. PCT/JP2009/067979, filed on Oct. 19, 2009.

(30) Foreign Application Priority Data

Nov. 12, 2008 (JP) .................. 2008-289833

(51) Int. Cl.
*B60G 3/04* (2006.01)
*B60G 3/18* (2006.01)
*B21D 9/00* (2006.01)

(52) U.S. Cl. ... 280/124.134; 280/124.148; 280/124.135; 72/369

(58) Field of Classification Search ........... 280/124.134, 280/124.1, 124.135, 124.148; 72/369, 31.04, 72/31.1
See application file for complete search history.

(56) References Cited

U.S. PATENT DOCUMENTS

| | | | | |
|---|---|---|---|---|
| 2,188,910 A | * | 2/1940 | Leighton | 280/124.134 |
| 4,173,501 A | * | 11/1979 | Hildebrandt et al. | 148/224 |
| 4,596,128 A | * | 6/1986 | Ringersma et al. | 72/128 |
| 5,322,317 A | * | 6/1994 | Kusaka et al. | 280/124.134 |
| 6,250,657 B1 | * | 6/2001 | Valin et al. | 280/124.1 |
| 6,296,264 B1 | * | 10/2001 | Wimmer | 280/124.134 |
| 6,523,841 B2 | * | 2/2003 | Glaser et al. | 280/124.106 |
| 7,401,490 B2 | * | 7/2008 | Copeland et al. | 72/389.1 |
| 7,506,444 B2 | * | 3/2009 | Weise | 29/897.2 |
| 7,665,751 B2 | * | 2/2010 | Kunert et al. | 280/124.134 |
| 7,744,708 B2 | * | 6/2010 | Lopez et al. | 148/593 |
| 7,837,230 B2 | * | 11/2010 | Mellis et al. | 280/781 |
| 2002/0005621 A1 | * | 1/2002 | Christophliemke et al. | 280/124.134 |
| 2006/0151970 A1 | * | 7/2006 | Kaminski et al. | 280/124.134 |
| 2007/0040345 A1 | * | 2/2007 | Hardtke et al. | 280/124.164 |
| 2009/0120150 A1 | * | 5/2009 | Bishop | 72/57 |

FOREIGN PATENT DOCUMENTS

| | | |
|---|---|---|
| JP | 8-257640 | 10/1996 |
| JP | 10-166823 | 6/1998 |
| JP | 2000-225821 A | 8/2000 |
| JP | 2004-291963 A | 10/2004 |
| WO | 2006/093006 A1 | 9/2006 |

* cited by examiner

*Primary Examiner* — Drew Brown
(74) *Attorney, Agent, or Firm* — Clark & Brody

(57) ABSTRACT

An arm material for an upper arm or a lower arm is provided which constitutes a double wishbone suspension or the like of an automobile and which has a flat, hollow, closed cross-sectional shape and enables further decreases in size, decreases in weight, and increases in strength.

An arm material for an automobile suspension has a body made from a parts material made by metal. The parts material made by metal has a flat, hollow, closed cross-sectional shape having a pair of opposing long sides and is formed from a single member in its lengthwise direction. The body has at least a first bent portion which is bent in a plane roughly parallel to the pair of long sides.

5 Claims, 2 Drawing Sheets

ARM MATERIAL AND A METHOD FOR ITS MANUFACTURE

This application is a continuation of International Patent Application No. PCT/JP2009/067979, filed Oct. 19, 2009. This PCT application has not yet published.

TECHNICAL FIELD

This invention relates to an arm material and a method for its manufacture. Specifically, the present invention relates to an upper arm material and a lower arm material, which are structural elements of a double wishbone suspension or a multi-link suspension for an automobile and which has a light weight, a small size, a high strength, a high yield, and a low cost due to having a flat cross-sectional shape. The present invention also relates to a method for its manufacture.

BACKGROUND ART

In recent years, wishbone suspensions and MacPherson strut suspensions have been much used as suspensions for automobiles. Among wishbone suspensions, a double wishbone suspension supports a wheel and a tire through a link mechanism having a parallelogram shape constituted by an upper arm and a lower arm. With a double wishbone suspension, when the wheel moves up and down due to input from the road surface, the kingpin inclination and the camber angle do not readily deviate, making it easy to stably maintain the area of contact between the tire and the road surface. A multi-link suspension which is a variation on a double wishbone suspension is also much used as a suspension for automobiles.

An arm material for an upper arm (also called an upper control arm) and a lower arm, which are structural components of a double wishbone suspension and a multi-link suspension (collectively referred to in this description as a "double wishbone suspension"), has heretofore been manufactured by welding of parts formed by press working of a steel sheet, by punching of a thick plate, by forging of an aluminum alloy, and similar methods.

In recent years, decreasing the weight of automobiles has been promoted as a countermeasure against global warming. A double wishbone suspension tends to become larger in structure than a MacPherson strut suspension, so its weight tends to increase. For this reason, there is a strong demand for further decreases in weight, decreases in size, increases in strength, and decreases in the cost of structural parts such as upper arms and lower arms of double wishbone suspensions.

Patent Document 1 discloses an invention pertaining to a wishbone suspension having an upper arm which is formed into the shape of an A by bending of a single metal sheet and which has an upper portion, an inner flange, and an outer flange. A ball joint support portion is provided at the outer end in the widthwise direction of the vehicle body on the upper portion of the arm. A bush support portion is provided on the inner end in the widthwise direction of the vehicle body on the inner flange. The inner flange and the outer flange are formed so that on the outer side in the widthwise direction of the vehicle body, the length in the vertical direction of the outer flange is longer than the length in the vertical direction of the inner flange. In addition, the inner flange and the outer flange are formed so that on the inner side in the widthwise direction of the vehicle body, the length in the vertical direction of the inner flange is longer than the length in the vertical direction of the outer flange. That invention can reduce the weight and increase the stiffness of an upper arm.

That upper arm is manufactured by bending a base material comprising a single metal sheet into the shape of an A. Therefore, manufacturing costs are necessarily high, and there is unavoidably a bending limit. This makes it difficult to form a shape which is ideal from the standpoint of performance, and yield is poor.

In addition, there are demands for further increases in the strength of this type of upper arms.

Patent Document 2 discloses an arm for a suspension having a double tube structure in locations requiring strength. According to that invention, a suspension arm is manufactured by fitting a reinforcing pipe member at locations requiring strength, and carrying out drawing, hydroforming, and press forming to obtain a final form. That manufacturing method requires complicated working steps, so the yield of a product is poor and it is difficult to reduce costs. In addition, it has the problem that strength is markedly decreased in locations which are not reinforced.

In Patent Document 3, the present applicant disclosed an invention relating to a bending apparatus. FIG. 3 is an explanatory view schematically showing that bending apparatus 0. In that invention, as shown in FIG. 3, a product formed by bending (a bent product) is manufactured using a bending method in which a metal pipe or a metal rod (collectively referred to below as a metal pipe) 1 which is supported by a support means 2 so as to be able to move in its axial direction undergoes bending on the downstream side of the support means 2 while being fed from the upstream side to the downstream side by a feed device 3.

Namely, a high frequency heating coil 5 rapidly locally heats the metal pipe 1 on the downstream side of the support means 2 to a temperature at which quenching is possible. On the downstream side of the high frequency heating coil 5, a water cooling device 6 rapidly cools the heated metal pipe 1. A movable roller die 4 has at least one pair of rolls 4a which can support the metal pipe 1 as it is being fed. The movable roller die 4 imparts a bending moment to the portion of the metal pipe 1 which was heated to a high temperature by moving two-dimensionally or three-dimensionally on the downstream side of the cooling device 6, thereby performing bending of the metal pipe 1. According to that invention, a bent product can be manufactured with a high operating efficiency while achieving a desired working accuracy.

PRIOR ART DOCUMENTS

Patent Documents

Patent Document 1: JP 2004-291963 A
Patent Document 2: JP 10-166823 A
Patent Document 3: WO 2006/93006

DISCLOSURE OF INVENTION

Problem which the Invention is to Solve

With the upper arms and the methods of manufacturing an arm disclosed in Patent Documents 1 and 2, it was extremely difficult to simultaneously achieve a light weight, a small size, a high strength, a high yield, and a low cost. In particular, those manufacturing methods have a plurality of steps, so manufacture is time-consuming, manufacturing costs are high, and yield is poor.

The bending apparatus disclosed in Patent Document 3 is premised on using a metal pipe having a round cross section as a base material. If it is attempted to manufacture an upper arm of a double wishbone suspension using that bending apparatus, it is necessary to use a base material made by metal having a flat cross section including at least a pair of long sides and to perform bending in a plane including one of the long sides to manufacture a bent product which is bent in a plane roughly parallel to the pair of long sides.

However, in that bending process, the base material made by metal having a flat cross section is bent in a direction having an extremely large deformation resistance. Therefore, distortion or breakage of the base material may occur during bending. For this reason, there have been no studies whatsoever of manufacturing an upper arm and a lower arm using that bending method.

The object of the present invention is to further decrease the weight, decrease the size, increase the strength, increase the yield, and decrease the cost of an upper arm and a lower arm of a double wishbone suspension for an automobile.

Means for Solving the Problem

The present inventors performed diligent investigations concerning the bending apparatus disclosed in Patent Document 3. They found it to be an extremely unhackneyed bending apparatus in that it has the ability to easily and reliably form a bent product having a complicated shape which was not thought to be possible in accordance with the technical common sense of those skilled in the art. As a result of further studies, the present inventors found that by using that bending apparatus, it is possible to provide an arm material which enables further decreases in weight, decreases in size, increases in strength, increases in yield, and reductions in cost. As a result, they completed the present invention.

The present invention is an arm material and more specifically an upper arm material or a lower arm material for an automobile suspension, the arm material having a body comprising a parts material made by metal. The parts material made by metal has a flat, hollow, closed cross-sectional shape having a pair of opposing long sides, and it is formed as a single member in its lengthwise direction.

The body has at least a first bent portion which is bent in a plane roughly parallel to the pair of long sides.

From another standpoint, the present invention is a method of manufacturing the above-described arm material according to the present invention by (a) supporting a parts material made by metal having a flat, hollow, closed cross-sectional shape at a first position while relatively feeding it in its lengthwise direction, (b) locally heating the parts material made by metal being fed at a second position downstream from the first position in the feed direction of the parts material made by metal, (c) at a third position downstream from the second position in the feed direction of the parts material made by metal, cooling the portion of the parts material made by metal which was heated at the second position, and (d) imparting a bending moment to the heated portion of the parts material made by metal by supporting the parts material made by metal by a support means in a region downstream from the third position in the feed direction of the parts material made by metal while varying the position of the support means two-dimensionally or three-dimensionally at least in a plane roughly parallel to the pair of long sides in the region.

In the present invention, the body preferably has at least a first portion and a second portion in its lengthwise direction, and a second bent portion between the first portion and the second portion so that a pair of long sides in the first portion and a pair of long sides in the second portion are in different planes from each other.

In the present invention, installation holes or the like for a ball joint support portion or a wheel hub installation portion can be provided in the arm material to obtain an upper arm or a lower arm as a final product.

Effects of the Invention

According to the present invention, an arm material which is a member of a double wishbone suspension for an automobile is provided. This arm material has a flat, hollow, closed cross-sectional shape, and therefore it can achieve further decreases in weight, decreases in size, increases in strength, increases in yield, and decreases in cost.

LIST OF REFERENTIAL NUMBERS IN THE DRAWINGS

1: material made by metal,
1-1: parts material made by metal,
2: support means,
3: feed device,
4a: roll pair,
4: movable roller die (movable support means),
5: high frequency heating coil,
6: water cooling device,
10: double wishbone suspension,
11: arm material,
11a: body of arm material,
12, 13: long sides,
14: closed cross-sectional shape,
15: surface,
16: first bent portion,
17: first portion,
18: second portion,
19: second bent portion

MODES FOR CARRYING OUT THE INVENTION

Below, best modes for carrying out the present invention will be explained in detail while referring to the attached drawings. In the following explanation, an example will be given of the case in which an arm material according to the present invention is an upper arm material for a double wishbone suspension. However, the present invention is not limited to this mode, and it can be similarly applied to an upper arm material for a multi-link suspension, and it can also be applied to a lower arm material.

[Arm Material]

Figure 1:
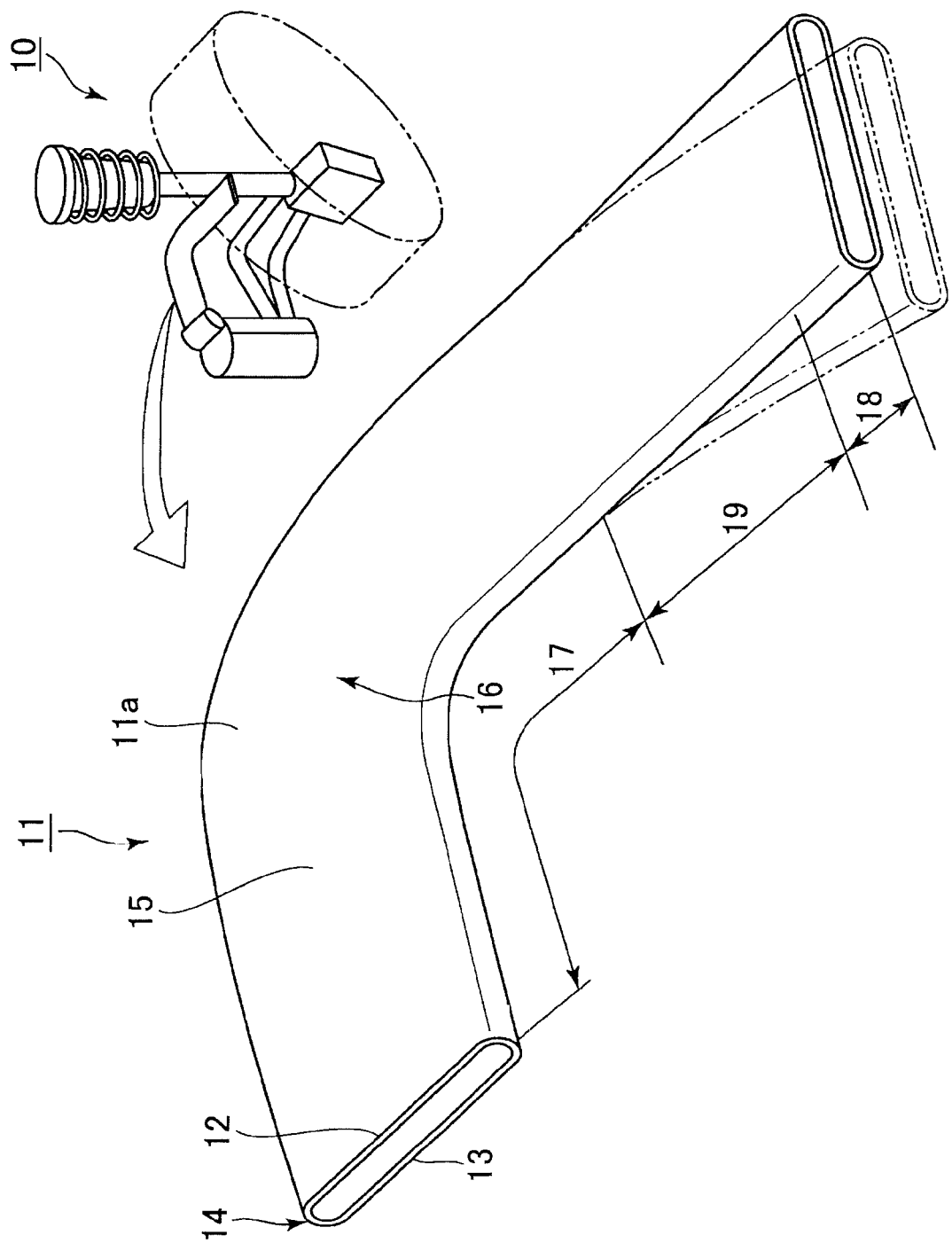
FIG. 1 is an explanatory view showing in simplified and schematic form an example of the structure of an upper arm of a double wishbone suspension according to the present invention.

FIG. 1 is an explanatory view showing in simplified and schematic form an example of the structure of an arm material 11 of a double wishbone suspension 10 according to the present invention.

As shown in this figure, this arm material 11 has a body 11a formed from a parts material made by metal. The body 11a is formed from a single member in the lengthwise direction. The body 11a is also formed from a single member in the circumferential direction in a transverse cross section. However, the present invention is not limited to this structure, and the body may have one or more joints (such as welds) in the circumferential direction.

The body 11a has a flat, hollow, closed cross-sectional shape 14 over its entire length. The closed cross-sectional shape 14 has a pair of opposing long sides 12 and 13. The body 11a has a first bent portion 16 in a plane 15 which is roughly parallel to the pair of long sides 12 and 13. The first bent portion 16 is two-dimensionally bent.

As shown by the single-dash chain line in FIG. 1, the body 11a has at least a first portion 17 and a second portion 18 in the lengthwise direction.

The body 11a has a second bent portion 19 between the first portion 17 and the second portion 18. With this structure, the body 11a has a deformed shape such that the pair of long sides 12 and 13 in the first portion 17 and the pair of long sides 12 and 13 in the second portion 18 are in different planes from each other.

The body of the arm material may have two or more bent portions 16. Similarly, the body of the arm material may have two or more bent portions 19.

Next, a method of manufacturing this arm material 11 will be explained.

[Manufacturing Method]

Figure 2:
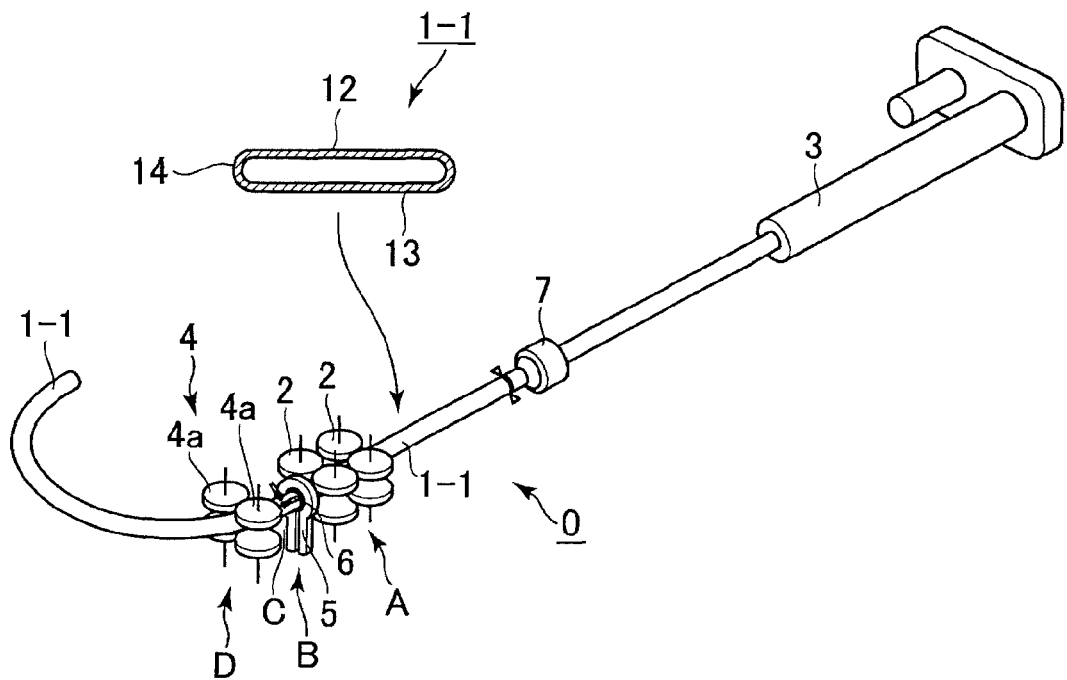
FIG. 2 is an explanatory view schematically showing an example of a method of manufacturing an arm material according to the present invention.
Figure 3:
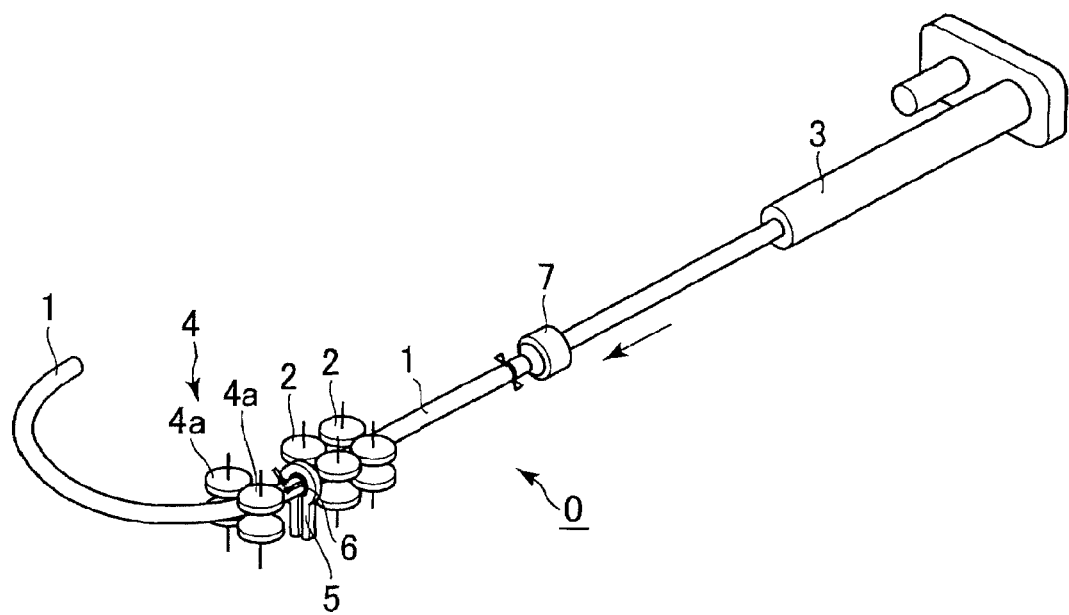
FIG. 3 is an explanatory view schematically showing a bending apparatus according to the invention disclosed in Patent Document 3 by the present applicant.

FIG. 2 is an explanatory view schematically showing an example of a method of manufacturing this arm material 11.

As shown in FIG. 2, a long parts material made by metal 1-1 is used as a base material. The long parts material made by metal 1-1 has a flat, hollow, closed cross-sectional shape 14.

A feed devices 3 feeds the parts material made by metal 1-1 in its lengthwise direction. An example of the feed device 3 is one using an electric powered servo cylinder. The feed device 3 does not need to be restricted to a specific type of feed device. For example, a known feed device such as one using a ball screw or one using a timing belt or chain can be used as this feed device.

The parts material made by metal 1-1 is fed at a predetermined speed in its lengthwise direction (the axial direction) by the feed device 3 while being held by a gripping portion 7.

A support means 2 supports the parts material made by metal 1-1 at a first position A. The support means 2 supports the parts material made by metal 1-1 which is being fed in its axial direction by the feed device 3 at the first position A so that the parts material made by metal 1-1 is able to move. By way of example, a pair of opposing undriven rolls can be used as the support means 2. The support means 2 does not need to be limited to a specific type, and it is possible to use another conventional support means as a support device. In this manner, the parts material made by metal 1-1 passes the installation position A of the support means 2 and is fed in its lengthwise direction.

At a second position B downstream of the first position A in the feed direction of the parts material made by metal 1-1, a high frequency heating device 5 locally heats the parts material made by metal 1-1 which is being fed.

A device having a coil which can perform high frequency induction heating of the parts material made by metal 1-1 can be used as the high frequency heating device 5. The high frequency heating device 5 can be a conventional high frequency heating device of this type.

The distance of the heating coil of the high frequency heating device 5 from the parts material made by metal 1-1 in a direction parallel to a direction perpendicular to the axial direction of the parts material made by metal 1-1 can be varied to perform non-uniform heating in the circumferential direction of a portion of the parts material made by metal 1-1 which is being fed.

It is possible to heat the parts material made by metal 1-1 a plurality of times by using at least one preheating means for the parts material made by metal 1-1 on the upstream side of the high frequency heating device 5 together with the high frequency heating device 5.

In addition, by using at least one preheating means for the parts material made by metal 1-1 on the upstream side of the high frequency heating device 5 together with the high frequency heating device 5, a portion of the parts material made by metal 1-1 being fed can be non-uniformly heated in the circumferential direction. In this manner, a portion of the parts material made by metal 1-1 can be locally rapidly heated by the high frequency heating device 5.

At a third position C which is downstream of the second position B in the feed direction of the material made by metal 1, a water cooling device 6 performs water cooling of the portion which was heated at the second position B. The water cooling device 6 cools the parts material made by metal 1-1 which was heated at the second position B and which is still at a high temperature state between position B and position C so that its deformation resistance is greatly decreased.

The water cooling device 6 can be any cooling device by which a desired cooling rate can be obtained, and it is not limited to a specific type of cooling device.

In general, a water cooling device is used. A water cooling device cools the parts material made by metal 1-1 by spraying cooling water at a predetermined position on the outer peripheral surface of the parts material made by metal 1-1.

The cooling water is sprayed at an angle with respect to the direction in which the parts material made by metal 1-1 is being fed. By varying the distance of the cooling means with respect to the parts material made by metal 1-1 in a direction parallel to a direction perpendicular to the axial direction of the parts material made by metal 1-1, the range of the heated region in the axial direction of the parts material made by metal 1-1 can be adjusted. In this manner, the water cooling device 6 rapidly cools the portion of the parts material made by metal 1-1 which was heated by the high frequency heating device 5.

By suitably adjusting the starting temperature of water cooling by the water cooling device 6 and the cooling rate, it is possible to quench all or a portion of the cooled portion of the parts material made by metal 1-1. As a result, the strength of all or a portion of the parts material made by metal 1-1 can be greatly increased to at least 1500 MPa, for example, or the strength of portions which undergo machining such as punching after bending (such as ball joint support portions and wheel hub installation portions) can be decreased to around 600 MPa, for example, whereby the ability to undergo mechanical working can be guaranteed.

In this manner, portions which are locally heated by the high frequency heating coil 5 and greatly reduced in deformation resistance are formed in portions of the parts material made by metal 1-1.

A movable roller die 4 is a movable support means for supporting the parts material made by metal 1-1 while moving it. A pair of movable rolls 4a, 4a of the movable roller die 4 move two-dimensionally in a plane which is roughly parallel to at least a pair of long sides 12, 13 of the parts material made by metal 1-1 in a region downstream of the third position C in the feed direction of the parts material made by metal 1-1. As a result, a bending moment is applied to the heated portion of the parts material made by metal 1-1.

Thus, the movable support means 4 supports the parts material made by metal 1-1 which is being fed in a region D downstream of the third position C in the feed direction of the parts material made by metal 1-1, and it moves two-dimensionally in a direction including at least the feed direction of the parts material made by metal 1-1 to apply a bending moment to the portion of the parts material made by metal 1-1 which was heated by the high frequency heating device 14.

In place of the above-described movable roller die 4, a chuck mechanism which grasps the inner surface or the outer surface of the parts material made by metal 1-1 can be used as a movable support means. When a chuck mechanism is employed, it can be supported by a vertical articulated industrial robot, for example.

When the chuck mechanism is supported by a vertical articulated industrial robot, a chuck mechanism which is supported by a vertical articulated industrial robot can be used instead of the support means 2, a vertical articulated industrial robot can be used as the feed device 3, and each of the high frequency heating device 5 and the water cooling device 6 can be supported by a vertical articulated industrial robot. With this arrangement, it is possible to simplify the structure of the manufacturing apparatus shown in FIG. 2.

By moving the movable support means 4 two-dimensionally in a plane roughly parallel to at least the pair of long sides 12 and 13 of the parts material made by metal 1-1, an arm material 11 having a body 11a with a shape shown by the solid lines in FIG. 1 can be manufactured.

By additionally moving the movable support means 4 up and down and moving the high frequency heating device 5 and the water cooling device 6 in synchrony therewith, an arm material 11 having a body 11a with a shape which has a second bent portion 19 and which is shown by the single-dash chain line in FIG. 1 can be manufactured.

In the above explanation, an example was given of a mode in which a material being worked in the form of a parts material made by metal 1-1 having a flat, hollow, closed cross-sectional shape 14 is fed in its lengthwise direction, and a support means 2, a high frequency heating device 5, and a water cooling device 6 are fixed in place with respect to the feed direction of the parts material made by metal 1-1. However, the present invention is not limited to this mode. As the opposite of this mode, a material being worked in the form of a parts material made by metal 1-1 can be fixed in place, and a support means 2, a high frequency heating device 5, and a water cooling device 6 can be disposed so as to be able to move in the lengthwise direction of the parts material made by metal 1-1.

In this manner, the above-described arm material 11 according to the present invention is manufactured. An arm material 11 according to the present invention has a flat, hollow cross-sectional shape. Therefore, an arm material 11 according to the present invention is light weight and compact. An arm material 11 according to the present invention can be further decreased in size and weight and increased in strength by suitably adjusting the starting temperature and the cooling rate of water cooling by the above-described water cooling device 6 so as to greatly increase the tensile strength to 1500 MPa or above, for example. Therefore, an arm material 11 according to the present invention is extremely suitable for use as an upper arm of a double wishbone suspension 10.

As described above, there is a strong demand for decreases in the weight of an upper arm for an automobile as a countermeasure against global warming. An upper arm which is manufactured from an arm material 11 according to the present invention can be decreased in weight by approximately 10-20% compared to a conventional upper arm which is manufactured by welding of a press worked product made from a steel sheet or by the method described in Patent Document 2.

As described above, an arm material 11 according to the present invention is quenched by suitably adjusting the starting temperature of water cooling and the cooling rate by the water cooling device 6. As a result, an arm material according to the present invention develops compressive residual stresses in the outer surface of the body 11a to increase its fatigue strength.

As explained while referring to FIG. 1, an arm material 11 according to the present invention is manufactured by an extremely simple manufacturing process, so its yield is high and its manufacturing costs are low.

An arm material according to the present invention can be manufactured as a material for a lower arm in the same manner as the above-described material for an upper arm.

The invention claimed is:

1. A hot-bent arm material for automobile suspension, characterized in that the arm material comprises a body member which is a single member in its lengthwise direction, the body member having a flat, closed cross-sectional shape and a pair of opposing long sides, and the body further comprises at least a first portion, a second portion, and a third portion between the first and second portions in its lengthwise direction, wherein said first portion has a first bent portion which is bent in a plane parallel to the pair of long sides and said third portion has a second bent portion which is bent in a plane perpendicular to the pair of long sides in the first portion and the pair of long sides in the second portion, so that the pair of long sides in the first portion and the pair of the long sides of the second portion are in different planes from each other, and wherein the body member has a quenched portion.

2. The hot-bent arm material for an automobile suspension as set forth in claim 1 wherein the first bent portion is the quenched portion.

3. The hot-bent arm material for an automobile suspension as set forth in claim 2 wherein the quenched portion has a tensile strength of 1500 MPa or more.

4. The hot-bent arm material as set forth in claim 1 wherein the arm is an arm for automobile suspension.

5. The hot-bent arm material as set forth in claim 4 wherein the arm is for a double wishbone suspension.

* * * * *